United States Patent
Dudda et al.

(10) Patent No.: US 12,063,546 B2
(45) Date of Patent: Aug. 13, 2024

(54) PACKET DUPLICATION TECHNIQUE

(71) Applicant: Telefonaktiebolaget LM Ericsson (publ), Stockholm (SE)

(72) Inventors: Torsten Dudda, Wassenberg (DE); John Walter Diachina, Garner, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 123 days.

(21) Appl. No.: 17/059,672

(22) PCT Filed: May 29, 2019

(86) PCT No.: PCT/EP2019/064010
§ 371 (c)(1),
(2) Date: Nov. 30, 2020

(87) PCT Pub. No.: WO2019/229145
PCT Pub. Date: Dec. 5, 2019

(65) Prior Publication Data
US 2021/0266786 A1    Aug. 26, 2021

Related U.S. Application Data

(60) Provisional application No. 62/677,710, filed on May 30, 2018.

(51) Int. Cl.
*H04W 28/06*   (2009.01)
*H04L 43/0829* (2022.01)
(Continued)

(52) U.S. Cl.
CPC ......... *H04W 28/06* (2013.01); *H04L 43/0835* (2013.01); *H04L 43/10* (2013.01);
(Continued)

(58) Field of Classification Search
CPC ..... H04W 24/10; H04W 80/02; H04W 24/08; H04W 72/042; H04W 28/06; H04L 43/0835; H04L 43/10
See application file for complete search history.

(56) References Cited

U.S. PATENT DOCUMENTS

2016/0057585 A1* 2/2016 Horn ............... H04W 28/12
                                                       370/312
2019/0081762 A1* 3/2019 Yang ............... H04L 1/1812
(Continued)

FOREIGN PATENT DOCUMENTS

WO     2017182927 A1    10/2017

OTHER PUBLICATIONS

3rd Generation Partnership Project, "3rd Generation Partnership Project; Technical Specification Group Radio Access Network; Evolved Universal Terrestrial Radio Access (E-UTRA) and NR; Multi-Connectivity; Stage 2 (Release 15)", Technical Specification, 3GPP TS 37.340 V15.1.0, Mar. 1, 2018, pp. 1-52, 3GPP.
(Continued)

*Primary Examiner* — Syed Ali
(74) *Attorney, Agent, or Firm* — COATS & BENNETT, PLLC

(57) ABSTRACT

A technique for controlling and monitoring packet duplication of at least one packet in a radio transmission from at least one transmitting station (100) to a receiving station (200) is described. As to a method aspect of the technique, a control message (710) that is indicative of the packet duplication in the radio transmission is transmitted to the receiving station (200). The control message (710) controls the receiving station (200) to monitor a reception of duplicates (712) of the at least one packet. Two or more duplicates (712) of the at least one packet are transmitted to the receiving station (200). A control feedback (714) that is
(Continued)

indicative of a result of the monitoring is received from the receiving station (200).

13 Claims, 9 Drawing Sheets

(51) Int. Cl.
*H04L 43/10* (2022.01)
*H04W 24/08* (2009.01)
*H04W 24/10* (2009.01)
*H04W 72/23* (2023.01)
*H04W 80/02* (2009.01)

(52) U.S. Cl.
CPC ........... *H04W 24/08* (2013.01); *H04W 24/10* (2013.01); *H04W 72/23* (2023.01); *H04W 80/02* (2013.01)

(56) References Cited

U.S. PATENT DOCUMENTS

| | | | |
|---|---|---|---|
| 2020/0077338 A1* | 3/2020 | Sui | H04W 52/0229 |
| 2020/0092946 A1* | 3/2020 | Xiong | H04L 5/0094 |
| 2020/0100317 A1* | 3/2020 | Jiang | H04L 5/0094 |
| 2020/0236587 A1* | 7/2020 | Kim | H04L 1/1614 |
| 2021/0022124 A1* | 1/2021 | Miao | H04W 72/23 |
| 2021/0135791 A1* | 5/2021 | Wang | H04W 72/20 |

OTHER PUBLICATIONS

OPPO, "MAC Operation on the Duplicated Data from PDCP Layer", 3GPP TSG-RAN2 #97bis, Spokane, USA, Apr. 3, 2017, pp. 1-2, R2-1702546, 3GPP.

3rd Generation Partnership Project, "3rd Generation Partnership Project; Technical Specification Group Radio Access Network; NR; NR and NG-RAN Overall Description; Stage 2 (Release 15)", Technical Specification, 3GPP TS 28.300 V15.1.0, Mar. 1, 2018, pp. 1-71, 3GPP.

* cited by examiner

800

900

PACKET DUPLICATION TECHNIQUE

TECHNICAL FIELD

The present disclosure relates to a radio communication technique using packet duplication. More specifically, and without limitation, methods and devices are provided for controlling and monitoring packet duplication of at least one packet in a radio communication between at least one transmitting station and a receiving station.

BACKGROUND

New Radio (NR) is a radio access technology (RAT) defined by the Third Generation Partnership Project (3GPP) to support critical machine-type communication (MTC) as well as Ultra Reliability and Low Latency (URLL) communication, e.g., for industrial automation and vehicle-to-vehicle (V2V) communication. For example, factory automation may require reliable radio communication for motion control with a latency equal to or less than 1 ms. As a further example, Intelligent Transportation Systems (ITS) may require reliable radio communication for decreasing the distances between a group of cars or trucks (so-called platooning) with a latency equal to or less than 5 ms. Packet duplication can be applied in these and further situations to at least one of increase reliability and decrease latency.

A conventional packet duplication technique may be implemented at a transmitting side of the radio communication by transmitting twice a packet that is subject of the packet duplication. A conventional receiver may be configured to discard the second duplicate of the two duplicates based on a sequence number that is identical to the first duplicate. If one of the two duplicates is not successfully received, the operation of the conventional receiver may be identical to a successful transmission of the packet without packet duplication. That is, the conventional receiver may be agnostic as to whether one packet has been successfully received or only one out of multiple duplicates has been successfully received.

Such a conventional packet duplication technique may be readily implemented, e.g., without any implementations at the receiving side. However, the actual reliability of the radio communication is uncontrolled or may be estimated only indirectly, e.g., based on basic radio channel states and signal to noise and interference ratios reported by the receiver. Hence, the reliability of the radio communication may be not guaranteed and unexpectedly lost in at least some situations.

SUMMARY

Accordingly, there is a need for a radio communication technique that controls or monitors the reliability of the radio communication. Alternatively or more specifically, there is a need for a radio communication technique that enables detecting a decline in the reliability before latency is increased.

As to a first method aspect, a method of controlling packet duplication of at least one packet in a radio transmission from at least one transmitting station to a receiving station is provided. The method may comprise or initiate a step of transmitting a control message to the receiving station. The control message may be indicative of the packet duplication in the radio transmission. The control message may control the receiving station to monitor a reception of duplicates of the at least one packet. The method may further comprise or initiate a step of transmitting, to the receiving station, two or more duplicates of the at least one packet. The method may further comprise or initiate a step of receiving, from the receiving station, a control feedback that is indicative of a result of the monitoring.

At least in some embodiments, the at least one transmitting station may control the radio transmission, e.g., the packet duplication, based on the control feedback. By transmitting the control message, the at least one transmitting station may control the receiving station to report an incomplete reception of the two or more duplicates as the result of the monitoring. Based on the control feedback, the at least one transmitting station may detect a decline in the reliability of the radio transmission. The decline in reliability may be detected before the latency of the radio transmission is negatively affected, e.g., increased by a retransmission.

In same or further embodiments, based on the control message, the receiving station may be aware of the packet duplication by performing the monitoring. As a result of the monitoring of the packet duplication, the receiving station may indicate a decline in the reliability by means of the control feedback, e.g., based on the loss of one or more of the duplicates, before all duplicates of one packet are lost.

The control feedback may be indicative of the completeness or incompleteness of the reception of the duplicates for the at least one packet, the number of successfully received duplicates and/or the number of unsuccessfully received duplicates. The control feedback may control a data transmission from the at least one transmitting station to the receiving station.

Based on the control feedback, the at least one transmitting station may control the data transmission and/or the packet duplication, e.g., by changing at least one of the number of duplicates per packet, a modulation scheme of the radio transmission and/or a coding scheme of the radio transmission. For example, the less duplicates are successfully received and/or the more duplicates are lost in the radio transmission (e.g., as indicate by the control feedback), the more duplicates per packet may be transmitted and/or the more conservative may be the modulation scheme and/or the coding scheme.

Alternatively or in addition, if the control feedback is indicative of a failure (i.e., a loss of one or more duplicates of one of the at least one packet), the at least one transmitting station may stop a service before a reliability and/or latency required by the service is not fulfilled.

The control message may announce the packet duplication for the at least one packet. The monitoring of the reception of the duplicates may be activated by the control message. In contrast to a conventional hybrid automatic repeat request (HARQ) retransmission that is adaptive, the transmission of the at least two duplicates may be preemptive.

Furthermore, the method (particularly the duplication of the packet resulting in the duplicates of said packet) may be implemented on a Packet Data Convergence Protocol (PDCP) layer and/or may span over a midhaul between a PDCP entity and nodes (e.g., the at least one transmitting station) implementing Radio Link Control (RLC) and/or HARQ. More specifically, the monitoring on the PDCP layer may detect failures and/or delays on layers above RLC and HARQ.

Herein, duplicates of a packet may encompass all equivalent or identical packets, e.g., a first instance of the packet and one or more further instances of the packet. For example, the duplicates may encompass an original packet and copies of the original packet. The duplicates may be transmitted on different subcarriers or carriers, on different spatial streams and/or from two or more transmitting stations, e.g., simultaneously. Alternatively or in addition, the duplicates may be transmitted in different transmission time intervals (TTI) or subframes.

Herein, the packet duplication may encompass any transmission of two or more duplicates per packet. The expression "duplication" may refer to identical or redundant content of the duplicates, e.g., with or without limiting the number of the duplicates per packet (e.g., per higher-layer data unit or per content) to two duplicates.

Furthermore, the control message controlling the receiving station to monitor the reception of duplicates may encompass that the control message initiates or triggers the monitoring at the receiving station and/or that the control message changes or updates a configuration of the monitoring at the receiving station.

The control feedback may be indicative of at least one of a success and a failure of the reception of the duplicates (e.g., as a result of the monitoring). The control feedback may be received for the first or each of the at least one packet that is subject to a failure of the reception of the duplicates.

The control message may be indicative of the number of duplicates per packet (e.g., the number of the at least two duplicates transmitted for each of the at least one packet). Monitoring the reception of the duplicates may encompass monitoring the reception of all of the indicated number of duplicates. For example, the reception of a specific packet may be successful only if the indicated number of duplicates is received for the packet.

Each of the at least one packet may be or may correspond to a protocol data unit (PDU) of a terminating layer of a communication protocol for the radio transmission. The communication protocol may be used for the radio transmission and/or may underlie the radio transmission. The terminating layer may generate the duplicates for each of the at least one packet.

The packet duplication may generate a predefined number of duplicates for each of the at least one packet. Each duplicate may correspond to only one of the at least one packet. For example, a payload or a service data unit (SDU) of each duplicate may comprise the corresponding one of the at least one packet.

The terminating layer may be a Packet Data Convergence Protocol (PDCP) layer. Each of the at least one packet may comprise or may be represented by a PDCP PDU.

Each of the duplicates may be or may correspond to a PDU of a split layer of the communication protocol for the radio transmission. The split layer may comprise at least one of a Radio Link Control (RLC) layer, a Medium Access Control (MAC) layer and a Physical (PHY) layer. Each of the at least two duplications may be, or may correspond to, a RLC PDU, a MAC PDU (e.g., a transport block, TB) or a transmission time interval (TTI).

The terminating layer may provide the duplicates to the split layer. The split layer may comprise entities each associated with a different one of the duplicates per packet. Each of the entities may processes the associated duplicate for each of the at least one packet.

The method may further comprise or initiate a step of reconfiguring the receiving station based on the control feedback. The reconfiguration may comprise changing at least one of a number of duplicates per packet, a modulation scheme of the radio transmission and a coding scheme of the radio transmission.

The method may further comprise or initiate a step of transmitting a configuration message to the receiving station. The configuration message may be indicative of the reconfiguration, e.g., a reconfiguration of the radio transmission responsive to the control feedback. Alternatively or in addition, the configuration message may be indicative of at least one of a stop of the packet duplication and a stop of the monitoring responsive to a failure of the reception of the duplicates.

A downlink from a radio network to the receiving station may comprise the radio transmission. The radio network may comprise the at least one transmitting station.

The receiving station may be embodied by a radio device, e.g., a user equipment (UE). The radio network may comprise one or more radio base stations (RBSs). Each of the transmitting stations may be embodied by one of the RBSs.

The method may be performed by at least one of a packet processing function (PPF) of the radio network and one or more of the at least one transmitting station. The PPF may be implemented at one of the at least one transmitting station.

The at least two duplicates may be transmitted using at least two different logical channels, respectively. The at least two different logical channels may be configured to provide carrier aggregation (CA) or dual connectivity (DC) to the receiving station.

As to a second method aspect, a method of monitoring packet duplication of at least one packet in a radio reception from at least one transmitting station at a receiving station is provided. The method may comprise or initiate a step of receiving a control message from one or more of the at least one transmitting station. The control message may be indicative of the packet duplication in the radio transmission. The method may further comprise or initiate a step of monitoring a reception of duplicates of the at least one packet from the at least one transmitting station. The method may further comprise or initiate a step of transmitting, to one or more of the at least one transmitting station, a control feedback that is indicative of a result of the monitoring.

At least some embodiments may enable a monitorability of the reliability for a radio link using the packet duplication. The radio link may be a New Radio (NR) or Long Term Evolution (LTE) radio link. Upon receiving what the receiving station considers to be the first instance of a given data unit (i.e., the first duplicate), the receiving station (e.g., a UE) may count and/or may measure a time for the at least one outstanding duplicate (e.g., of the at least two transmitted duplicates) to arrive in the monitoring step. The receiving station may inform the at least one transmitting station (e.g., an eNB or gNB), if a threshold indicating excessive occurrences of duplicates failing to arrive is met or exceeded.

The duplicates may be implemented by any duplicate data units. The monitoring may be controlled (e.g., triggered or initiated) by the control message.

The control feedback may be indicative of at least one of a success and a failure of the reception of the duplicates. The monitoring may comprises determining the success of the reception of the duplicates based on receiving a predefined number of the duplicates for each of the at least one packet. For example, the successful reception of duplicates (also: duplication instances) of the at least one packet may be determined based on two identical sequence numbers (SNs) in the received duplications.

The packet duplication of the at least one packet may comprise a plurality of packets each indicative of a (e.g., unique) SN. Furthermore, the packet duplication may comprise at least two duplicates per packet. Each of the duplicates may be indicative of the SN of the corresponding one of the plurality of packets. Duplicates indicative of identical SNs may correspond to the same packet.

Alternatively or in addition, the monitoring may comprise determining the failure of the reception of the duplicates based on receiving a duplicate indicative of a second SN after receiving only one duplicate or a predefined number of duplicates indicative of a first SN, wherein the second SN is greater than or subsequent to the first SN. The predefined number may be less than the number of transmitted duplicates per packet. More specifically, the failure may be determined, if (e.g., only if) a difference (or offset) between the second SN and the first SN exceeds a predefined threshold value. The predefined threshold value for the difference may be referred to as maximum skew.

Alternatively or in addition, the monitoring may comprise triggering a timer upon reception of the first duplicate for each of the at least one packet. The failure of the reception of the duplicates may be determined based on an expiry of the timer prior to the reception of a predefined number of duplicates per packet.

The two or more duplicates may be received over different logical channels. The step of determining may be performed by an entity terminating the at least two logical channels, e.g., by a PDCP entity at the receiving station.

The second method aspect may further comprise any feature, or may comprise or initiate any step, disclosed in the context of the first method aspect or a feature or step corresponding thereto. Vice versa, the first method aspect may further comprise any feature, or may comprise or initiate any step, disclosed in the context of the second method aspect or a feature or step corresponding thereto.

One or each of the at least one transmitting station may perform the first method aspect. The receiving station may perform the second method aspect.

In any aspect, the radio transmission of the at least one transmitting station and the radio reception of the receiving station may be referred to as radio communication. The radio communication may be, or may be implemented by, a downlink (DL) from a radio access network (RAN) and/or an uplink (UL) to the RAN. The RAN may comprise one or more radio base stations. Each of the radio base stations may be configured to provide radio access to one or more radio devices. Each of the radio devices may be configured for radio access to the RAN.

For the DL, each of the at least one transmitting station may be embodied by one of the radio base stations. The receiving station may be embodied by one of the radio devices. For the UL, the receiving station may be embodied by one of the radio base stations. Each of the at least one transmitting station may be embodied by one of the radio devices.

Alternatively or in addition, the radio communication may be, or may be implemented by, a sidelink (SL), e.g., a device-to-device (D2D) communication or a proximity service (ProSe). A radio network may comprise the transmitting and receiving stations. The radio network may be an ad hoc network and/or a mesh network. The technique may be implemented for any D2D or direct communication between transmitting and receiving stations. The SL may be implemented according to the Third Generation Partnership Project (3GPP), particularly the document 3GPP TS 23.303, version 15.0.0. The SL radio communication may comprise a vehicular communication or Vehicle-to-Everything (V2X) communication, e.g., according to the document 3GPP TS 22.185, e.g., version 14.3.0; 3GPP TS 23.285, e.g., version 15.0.0 and/or the document 3GPP TR 36.786, e.g., version 14.0.0.

Any one of the at least one transmitting station and the receiving station may be a user equipment (UE) or a radio base station (RBS), e.g., according to the standard family of 3GPP, e.g., Long Term Evolution (LTE) and/or New Radio (NR), particularly LTE-Advanced or non-standalone NR. Alternatively or in addition, any one of the stations may be a mobile or portable station (STA) or an access point (AP), e.g., according to the standard family of IEEE 802.11 (also: Wi-Fi), particularly Wi-Fi Direct or Wi-Fi Peer-to-Peer.

Any one of the stations may be a device for machine-type communication (MTC). Examples for the UE and the STA include a mobile phone, a tablet computer, a laptop computer and a television set. Examples for the MTC device include self-driving vehicles, robots, sensors and/or actuators, e.g., in manufacturing or automotive communication. One of the base stations (e.g., in a RAN) or one of the radio devices (e.g. in an ad hoc network) may function as a gateway between the radio network and the Internet, particularly for a data link to a host computer providing user data to the receiving stations.

Examples for the base stations may include a 3G base station or Node B, 4G base station or eNodeB (eNB), a 5G base station or gNodeB (gNB), and a Wi-Fi AP. The RAN may be implemented according to the Global System for Mobile Communications (GSM), the Universal Mobile Telecommunications System (UMTS), 3GPP Long Term Evolution (LTE) and/or 3GPP New Radio (NR).

As to another aspect, a computer program product is provided. The computer program product comprises program code portions for performing any one of the steps of the first and/or second method aspect disclosed herein when the computer program product is executed by one or more computing devices. The computer program product may be stored on a computer-readable recording medium. The computer program product may also be provided for download via the radio network, the RAN, the Internet and/or the host computer. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for controlling packet duplication of at least one packet in a radio transmission from at least one transmitting station to a receiving station is provided. The device may be configured to perform the first method aspect. Alternatively or in addition, the device may comprise a transmitting unit configured to transmit a control message to the receiving station. The control message may be indicative of the packet duplication in the radio transmission. The control message may control the receiving station to monitor a reception of duplicates of the at least one packet. The device may further comprise a transmitting unit configured to transmit, to the receiving station, two or more duplicates of the at least one packet. The device may further comprise a receiving unit configured to receive, from the receiving station, a control feedback that is indicative of a result of the monitoring.

As to a second device aspect, a device for monitoring packet duplication of at least one packet in a radio reception from at least one transmitting station at a receiving station is provided. The device may be configured to perform the second method aspect. Alternatively or in addition, the device may comprise a receiving unit configured to receive a control message from one or more of the at least one transmitting station. The control message may be indicative of the packet duplication in the radio transmission. The device may further comprise a monitoring unit configured to monitor a reception of duplicates of the at least one packet from the at least one transmitting station. The device may further comprise a transmitting unit configured to transmit, to one or more of the at least one transmitting station, a control feedback that is indicative of a result of the monitoring.

As to a further first device aspect, a device for controlling packet duplication of at least one packet in a radio transmission from at least one transmitting station to a receiving station is provided. The device comprises at least one processor and a memory. Said memory may comprise instructions executable by said at least one processor whereby the device is operative to transmit, to the receiving station, a control message. The control message may be indicative of the packet duplication in the radio transmission. The control message may control the receiving station to monitor a reception of duplicates of the at least one packet. Execution of the instructions may further cause the device to be operative to transmit, to the receiving station, two or more duplicates of the at least one packet. Execution of the instructions may further cause the device to be operative to receive, from the receiving station, a control feedback that is indicative of a result of the monitoring.

As to a further second device aspect, a device for monitoring packet duplication of at least one packet in a radio reception from at least one transmitting station at a receiving station is provided. The device comprises at least one processor and a memory. Said memory may comprise instructions executable by said at least one processor whereby the device is operative to receive a control message from one or more of the at least one transmitting station. The control message may be indicative of the packet duplication in the radio transmission. Execution of the instructions may further cause the device to be operative to monitor a reception of duplicates of the at least one packet from the at least one transmitting station. Execution of the instructions may further cause the device to be operative to transmit, to one or more of the at least one transmitting station, a control feedback that is indicative of a result of the monitoring.

As to a still further aspect a communication system including a host computer is provided. The host computer may comprise a processing circuitry configured to provide user data, e.g., depending on a location of the UE or depending on the SL radio communication. The host computer may further comprise a communication interface configured to forward user data to a cellular network for transmission to a user equipment (UE), wherein the UE comprises a radio interface and processing circuitry, a processing circuitry of the cellular network being configured to execute any one of the steps of the first and/or second method aspect.

The communication system may further include the UE. Alternatively or in addition, the cellular network may further include one or more base stations and/or gateways configured to communicate with the UE and/or to provide a data link between the UE and the host computer using the first method aspect and/or the second method aspect.

The processing circuitry of the host computer may be configured to execute a host application, thereby providing the user data and/or any host computer functionality described herein. Alternatively or in addition, the processing circuitry of the UE may be configured to execute a client application associated with the host application.

Any of the devices (e.g., the transmitting station or the receiving station), the UE, the base station, the communication system or any node or station for embodying the technique may further include any feature disclosed in the context of the first and/or second method aspects, and vice versa. Particularly, any one of the units and modules, or a dedicated unit or module, may be configured to perform or initiate one or more of the steps of the first and/or second method aspects.

BRIEF DESCRIPTION OF THE DRAWINGS

Further details of embodiments of the technique are described with reference to the enclosed drawings, wherein.

DETAILED DESCRIPTION

Figure 1:
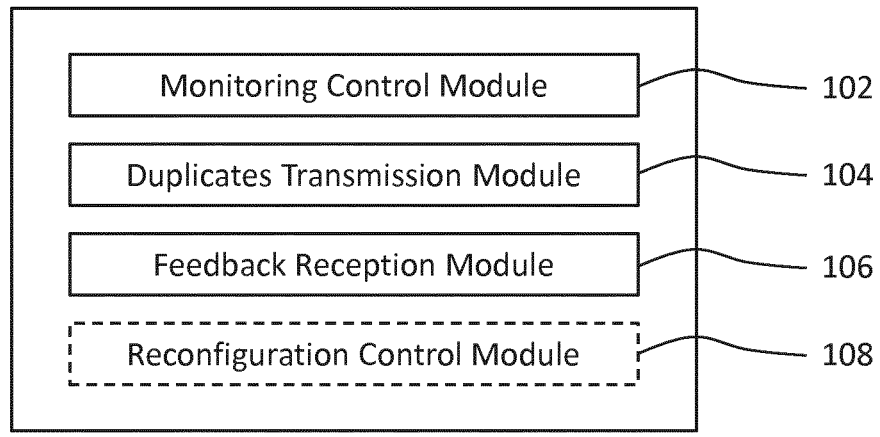
FIG. 1 shows a schematic block diagram of a device for controlling packet duplication.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire) or in a Wireless Local Area Network (WLAN or Wi-Fi) according to the standard family IEEE 802.11.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Furthermore, embodiments described herein are combinable, e.g., in parts or completely. For example, features indicated by like reference signs may correspond to equivalent or alternative implementations of said features. Such features indicated by like reference may be individually applicable to each of the embodiments described herein, without being limited to the embodiment for which the feature is described.

While embodiments of the technique are described in the context of 3GPP NR radio technology, e.g., according to the document 3GPP TS 38.300 V1.3.0, the embodiments are readily applicable to any other radio communication, particularly radio communications with certain requirements as to reliability and/or latency. Moreover, the skilled person appreciates that the objects and solutions described herein may be equally applicable to radio access networks (RANs) and user equipments (UEs) implementing other access technologies (RATs) and/or fulfilling other radio communication standards.

For clarity and not limitation, NR is used as an example RAT for which the technique may be suitable. Using NR in the description may be particularly useful for understanding the object and associated technical solutions. In particular, the technique may be applicable also to a RAN implementing 3GPP LTE or an integration of both 3GPP LTE and NR, e.g., according to non-standalone (NSA) NR.

FIG. 1 schematically illustrates a block diagram of a device for controlling packet duplication of at least one packet in a radio transmission from at least one transmitting station to a receiving station. The device is generically referred to by reference sign 100. The device 100 may also be referred to as a controlling device.

The device 100 comprises a monitoring control module 102 that transmits a control message to the receiving station. The control message is indicative of the packet duplication in the radio transmission. This indication controls (e.g., triggers) the receiving station to monitor a reception of duplicates of the at least one packet. A duplicates transmission module 104 of the device 100 transmits two or more duplicates of the at least one packet to the receiving station. A feedback reception module 106 receives a control feedback that is indicative of a result of the monitoring from the receiving station.

Optionally, a reconfiguration control module 108 of the device 100 changes a configuration for the radio transmission in response to the control feedback. Changing the configuration (which may also be referred to as reconfiguration) includes transmitting a configuration message to the radio device. For example, the configuration of a modulation and coding scheme (MCS) used for the radio transmission is changed, a configuration of the packet duplication (e.g., a number of duplicates per packet) is changed and/or a bearer using the packet duplication to fulfill an associated requirement as to reliability and/or latency is closed.

Any of the modules of the device 100 may be implemented by units configured to provide the corresponding functionality.

The device 100 may be identical with any of the at least one transmitting station, which may also be referred to as transmitting device 100 or transmitter 100.

Figure 2:
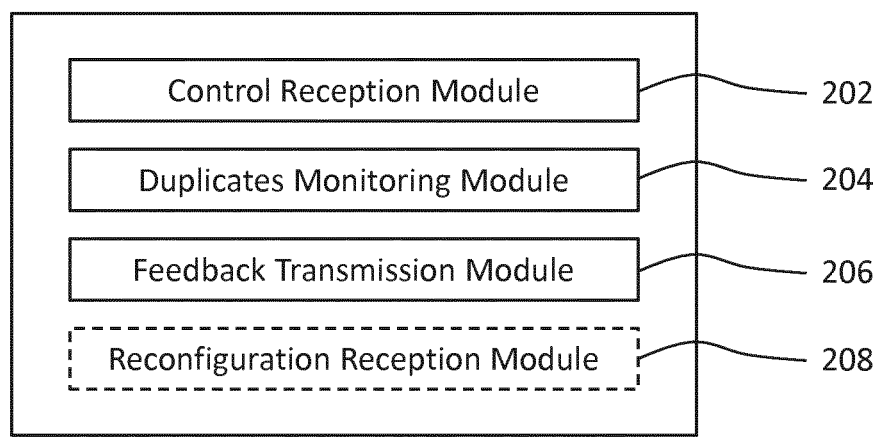
FIG. 2 shows a schematic block diagram of a device for monitoring packet duplication.

FIG. 2 schematically illustrates a block diagram of a device for monitoring packet duplication of at least one packet in a radio reception from at least one transmitting station at a receiving station. The device is generically referred to by reference sign 200.

The device 200 comprises a control reception module 202 that receives a control message from one or more of the at least one transmitting station. The control message is indicative of the packet duplication in the radio transmission. Responsive to the reception of this indication, a duplicates monitoring module 204 of the device 200 monitors a reception of duplicates of the at least one packet from the at least one transmitting station. A feedback transmission module 206 transmits a control feedback that is indicative of a result of the monitoring to one or more of the at least one transmitting station.

Optionally, a reconfiguration reception module 208 of the device 200 changes a configuration for the radio reception in responsive to receiving a configuration message from the at least one transmitting station. The changed configuration (which may also be referred to as reconfiguration) may relate to the physical layer or the application layer. For example, the configuration of a modulation and coding scheme (MCS) used for the radio reception is changed, a configuration of the packet duplication (e.g., a number of duplicates per packet for a successful reception of the duplicates) is changed and/or a bearer (e.g., used by an application performed at any of the stations or the host computer) relying on the packet duplication to fulfil an associated requirement as to reliability and/or latency is closed.

Any of the modules of the device 200 may be implemented by units configured to provide the corresponding functionality.

The device 200 may be identical with the receiving station, which may also be referred to as receiving device 200 or receiver 200.

Figure 3:
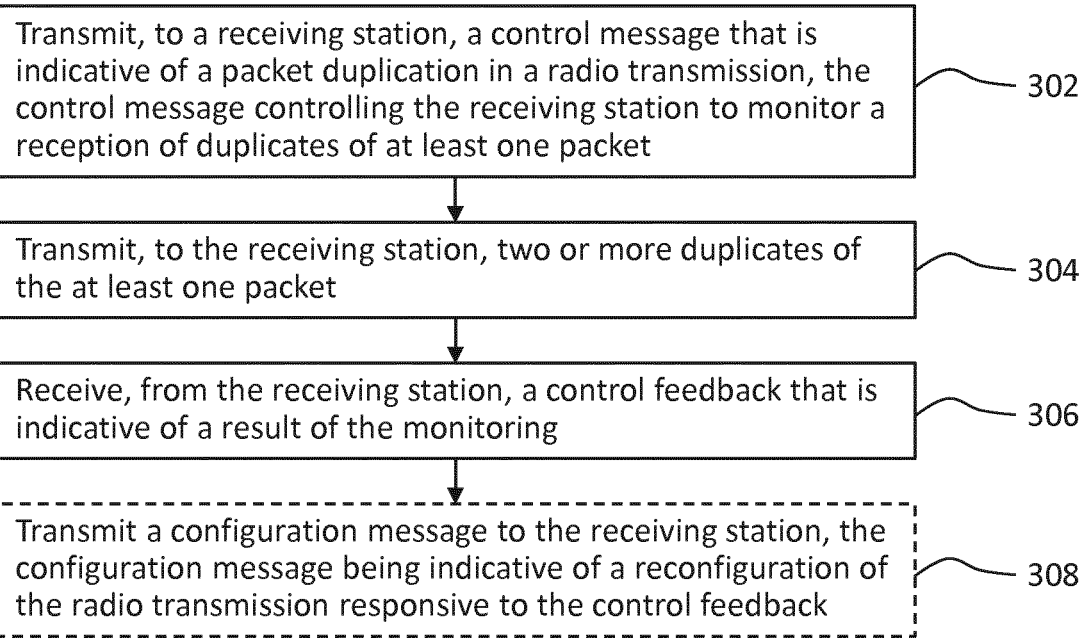
FIG. 3 shows a flowchart for a method of controlling packet duplication, which method may be implementable by the device of FIG. 1.

FIG. 3 shows a flowchart for a method 300 of controlling packet duplication of at least one packet in a radio transmission from at least one transmitting station to a receiving station. In a step 302 of the method 300, a control message, which is indicative of the packet duplication in the radio transmission, is transmitted to the receiving station. The control message controls the receiving station to monitor a reception of duplicates of the at least one packet. Two or more duplicates of the at least one packet are transmitted in a step 304 to the receiving station according to the control message. A control feedback, which is indicative of a result of the monitoring, is received in a step 306 from the receiving station.

Optionally, a configuration message indicative of a change in a configuration (also: reconfiguration) is transmitted to the receiving station in a step 308. For example, the configuration of a MCS used for the radio transmission is changed, a configuration of the packet duplication is changed and/or a bearer relying on the packet duplication to fulfill an associated requirement as to reliability and/or latency is closed. The configuration of the packet duplication may comprise a number of duplicates per packet, which are transmitted in the step 304. The bearer may be used by an application performed at any of the stations and/or the host computer.

The method 300 may be performed by the device 100. For example, the modules 102, 104 and 106 may perform the steps 302, 304 and 306, respectively.

Figure 4:
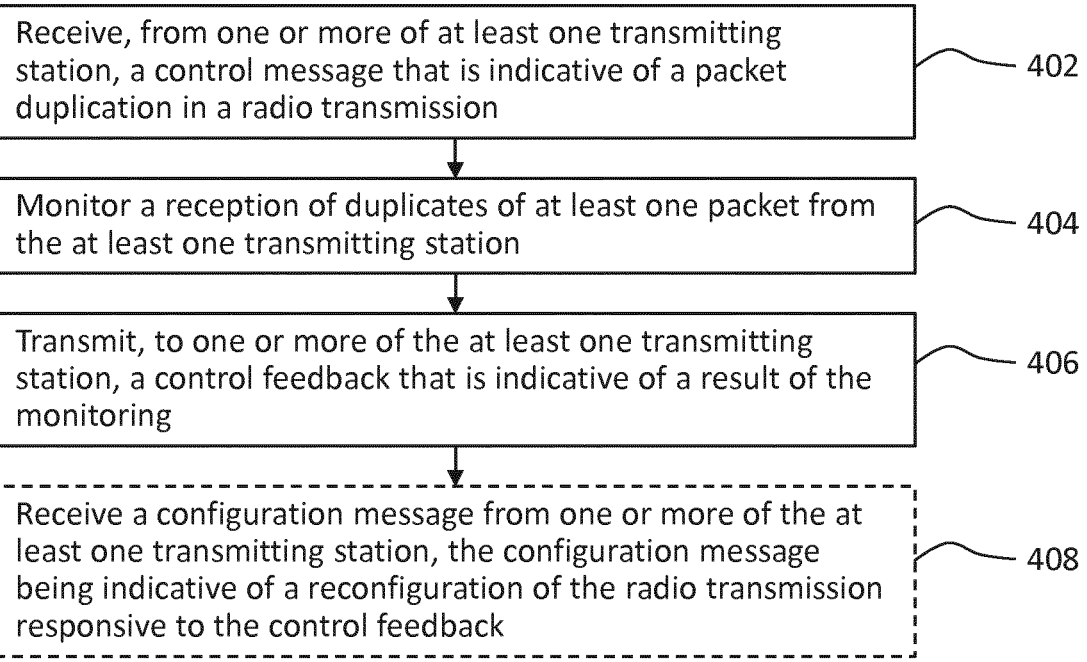
FIG. 4 shows a flowchart for a method of monitoring packet duplication, which method may be implementable by the device of FIG. 2.

FIG. 4 shows a flowchart for a method 400 of monitoring packet duplication of at least one packet in a radio reception from at least one transmitting station at a receiving station. In a step 402, a control message, which is indicative of the packet duplication in the radio transmission, is received from one or more of the at least one transmitting station. A reception of duplicates of the at least one packet from the at least one transmitting station is monitored in a step 404 according to the control message. A control feedback, which is indicative of a result of the monitoring, is transmitted in a step 406 to one or more of the at least one transmitting station.

Optionally, a configuration message indicative of a change in a configuration (also: reconfiguration) is received from the at least one transmitting station in a step 408. For example, the configuration of a MCS used for the radio reception in the step 404 is changed, a configuration of the packet duplication is changed and/or a bearer relying on the packet duplication to fulfill an associated requirement as to reliability and/or latency is closed. The configuration of the packet duplication may comprise a number of duplicates per packet, which are to be successfully decoded for determining a successful reception of the duplicates in the step 404. The bearer may be used by an application performed at any of the stations and/or the host computer.

The method 400 may be performed by the device 200. For example, the modules 202, 204 and 206 may perform the steps 402, 404 and 406, respectively.

Herein, any station, e.g., any one of the transmitting stations 100 and/or the receiving station 200, may be a mobile or portable station or a radio device wirelessly connectable to a radio access network (RAN). Any radio device may be a user equipment (UE) and/or a device for machine-type communication (MTC). Furthermore, the receiving station 200 and/or at least one or each of the at least one transmitting station may be a radio base station (RBS) or radio node of the RAN. The RBS may be an evolved Node B (eNodeB or eNB) or a Next Generation Node B (gNodeB or gNB).

The technique may be applied to any direct or sidelink (SL) radio communication between radio devices or to any uplink (UL) or downlink (DL) radio communication between the at least one radio base station and the radio device.

Each of the at least two duplicates per packet may be transmitted using a different one of at least two logical channels. The different logical channels may comprise different physical channel, e.g., distinguished by at least one of different frequencies (e.g., different carriers or subcarriers), different transmission time intervals (TTIs, e.g., subframes or slots) and/or different spatial streams (also: layers, e.g., precoding vectors) of the radio communication.

First embodiments of the device 100 and 200 implement the different logical channels by means of a split bearer, e.g., a multi connectivity between two or more radio base stations 100 and the radio device 200. For brevity, and without limitation thereto, the multi connectivity is described for a dual connectivity (DC) provided by two RBSs 100 (as two transmitting stations 100) to a UE 200 (as the receiving station 200).

For NR, the DC protocol architecture of a split bearer is specified according to the document 3GPP TS 37.340, version 15.1.0, e.g., building on the protocol architecture used for 3GPP LTE for the DC split bearer. In DC, the UE 200 is connected to two distinct RBSs or radio nodes 100. The UE 200 maintains a single Packet Data Convergence Protocol (PDCP) entity for the split bearer connected to multiple (e.g., two) Radio Link Control (RLC) entities and multiple (e.g., two) Medium Access Control (MAC) entities, as well as corresponding Physical layer (PHY) entities. These are each associated to a cell group, the master cell group and secondary cell group, respectively.

The transmission 304 of the first duplicate of the packet via the master cell group is performed by and/or forwarded to the Master RBS 100 (e.g., the Master gNB or MgNB in an NR implementation, or the Master eNB or MeNB in an LTE implementation). The transmission 304 of the second duplicate of the packet via the secondary cell group is performed by and/or forwarded to the Secondary RBS (e.g., the Secondary gNB in an NR implementation or SgNB, or the Secondary eNB or SeNB in an LTE implementation).

Each of the MgNB 100 and the associated SgNB maintain an own RLC entity and MAC entity associated to this single split bearer. A Packet Processing Function (PPF), which may be separate node or function, or which may be collocated with the MgNB 100 or the SgNB, terminates the PDCP protocol on the network side.

While the first embodiment of the device 100 has been described for an implementation at the Master RBS 100 (e.g., MgNB or MeNB), the terminating layer (e.g., the PPF) may also implement the device 100 according to the first embodiment. That is, the terminating layer 100, e.g., the PPF 100, performs the steps of the method 300 or initiates the respective Master and Secondary RBS to perform such steps.

In such a functional and/or spatial split, the centralized unit of the PDCP layer may also be called centralized unit (CU) 100. The remaining nodes implementing the protocol layers below the PDCP layer may be denoted distributed units (DUs).

In any embodiment, data units on the PDCP layer may implement the packets. The PDCP layer is an example for a terminating layer. In DC, data units on the PDCP layer may be routed (e.g., split) via either lower layer or duplicated and routed via both as further described below.

Second embodiments of the device 100 and 200 implement the different logical channels by means of different carriers, e.g., a carrier aggregation (CA) provided by the at least one radio base station 100 to the radio device 200. For brevity, and without limitation thereto, the CA is described for two carriers used by one RBS 100 (as the transmitting station 100) for the radio transmissions 302 and 304 to a UE 200 (as the receiving station 200).

Furthermore, 3GPP specified a CA protocol architecture for NR. In CA, the UE 200 is connected to one RBS 100 or radio node via multiple (e.g., two) carriers. The CA architecture maintains two physical layers (PHY). Besides this, the protocol stack at the RBS 100 comprises one MAC entity, one or two RLC entities and one PDCP entity.

In any embodiment, data units on the RLC layer and/or the MAC layer may implement the duplicates for each of the at least one packet.

In this way, in CA, different data units to be transmitted may be routed on the MAC layer via both carriers, e.g., to increase an offered bit rate and/or for the packet duplication. In the case of packet duplication, the protocol stack at the RBS 100 entails two RLC entities and two logical channels (LCHs), to which the terminating PDCP layer routes duplicate data units, and where transmission of each data unit is performed on a separate carrier by the MAC layer, e.g., to increase the probability of data unit reception, i.e., the reliability.

More generally, when packet duplication is configured for a radio bearer, e.g., by means of radio resource control (RRC) signaling, an additional RLC entity and an additional logical channel are added to the radio bearer to handle the duplicates. The RLC layer comprising the at least two RLC entities for the respective logical channels may also be referred to as split RLC layer or split layer. The duplicates may be duplicated PDCP Protocol Data Units or PDCP PDUs (e.g., representing one packet) included in Service Data Units or SDUs of the at least two RLC PDUs (e.g., representing the at least two duplicates) and/or the at least two MAC PDUs (e.g., representing the at least two duplicates).

Figure 5:
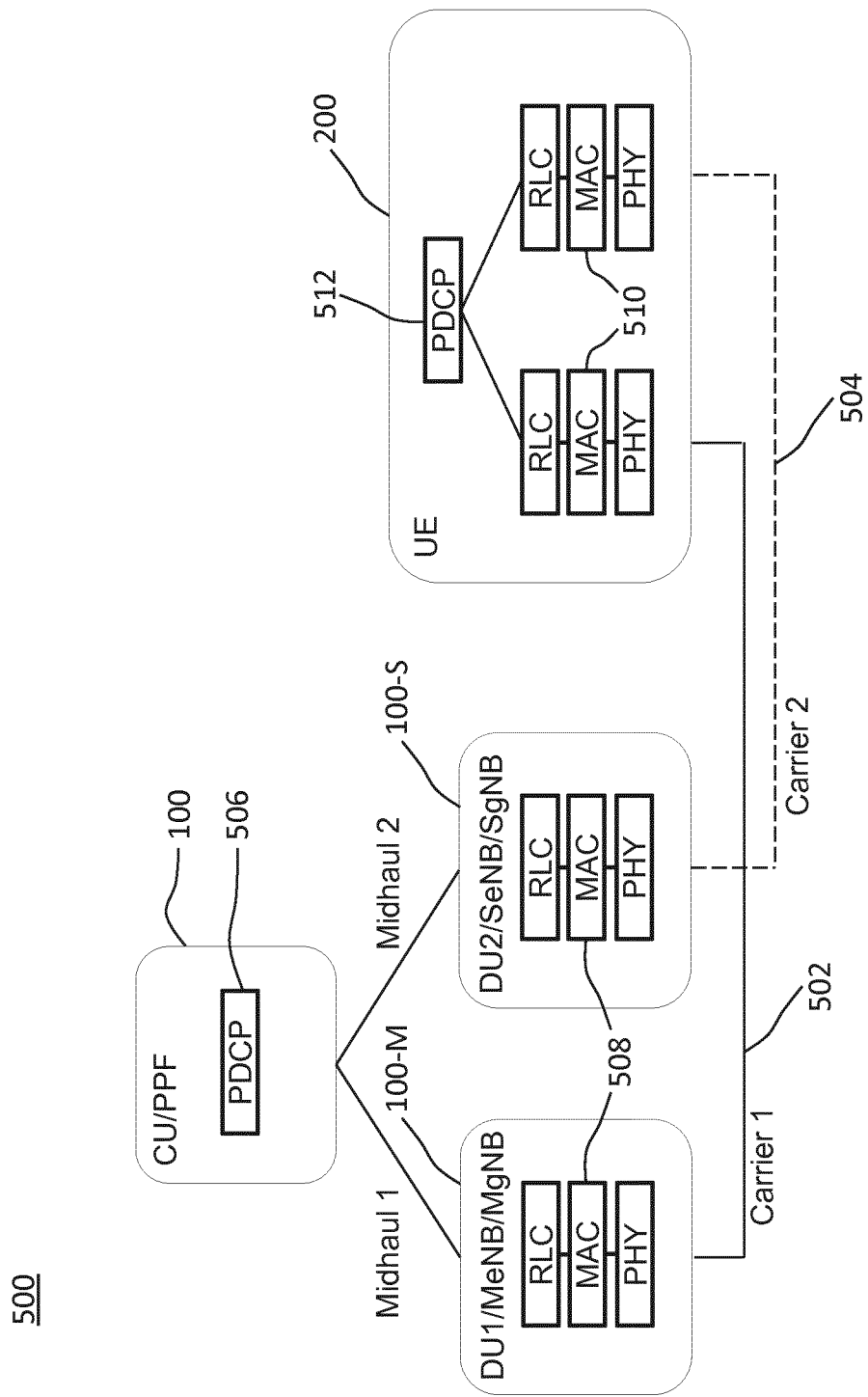
FIG. 5 schematically illustrates exemplary protocol stacks for first embodiments of the devices of FIGS. 1 and 2.

FIG. 5 schematically illustrates protocol stacks for exemplary first embodiments of the devices 100 and 200 using a DC architecture for the packet duplication. While the first embodiments are describes using the DC architecture of 3GPP NR, the first embodiments are also applicable for 3GPP LTE, in which the packet duplication may be used.

The at least two RBS 100-M and 100-S embody the transmitting stations and function as the Master RBS and the Secondary RBS, respectively, of the DC using the carriers 502 and 504, respectively.

In any embodiment, the PDCP layer 506 is an example of the terminating layer at the at least one transmitting station. In the case of DC as the first embodiment, the device 100 may be embodied by the PDCP layer (indicated at reference sign 100 in the exemplary first embodiment of FIG. 5), by the Master RBS 100-M, by the Secondary RBS 100-S, or a combination thereof.

At the radio network comprising the at least two RBS in the case of DC, each of the RLC layer and the MAC layer are examples for a split layer below the terminating PDCP layer 506. For example, the MAC layer comprises two MAC entities 508 for the two duplicates per packet, respectively.

In any embodiment of the UE 200, each of the RLC layer and the MAC layer may be examples for a split layer below the terminating PDCP layer 512. For example, the MAC layer comprises at least two MAC entities 510. A different one of the MAC entities 510 may be associated with a different one of the at least two duplicates per packet.

Figure 6:
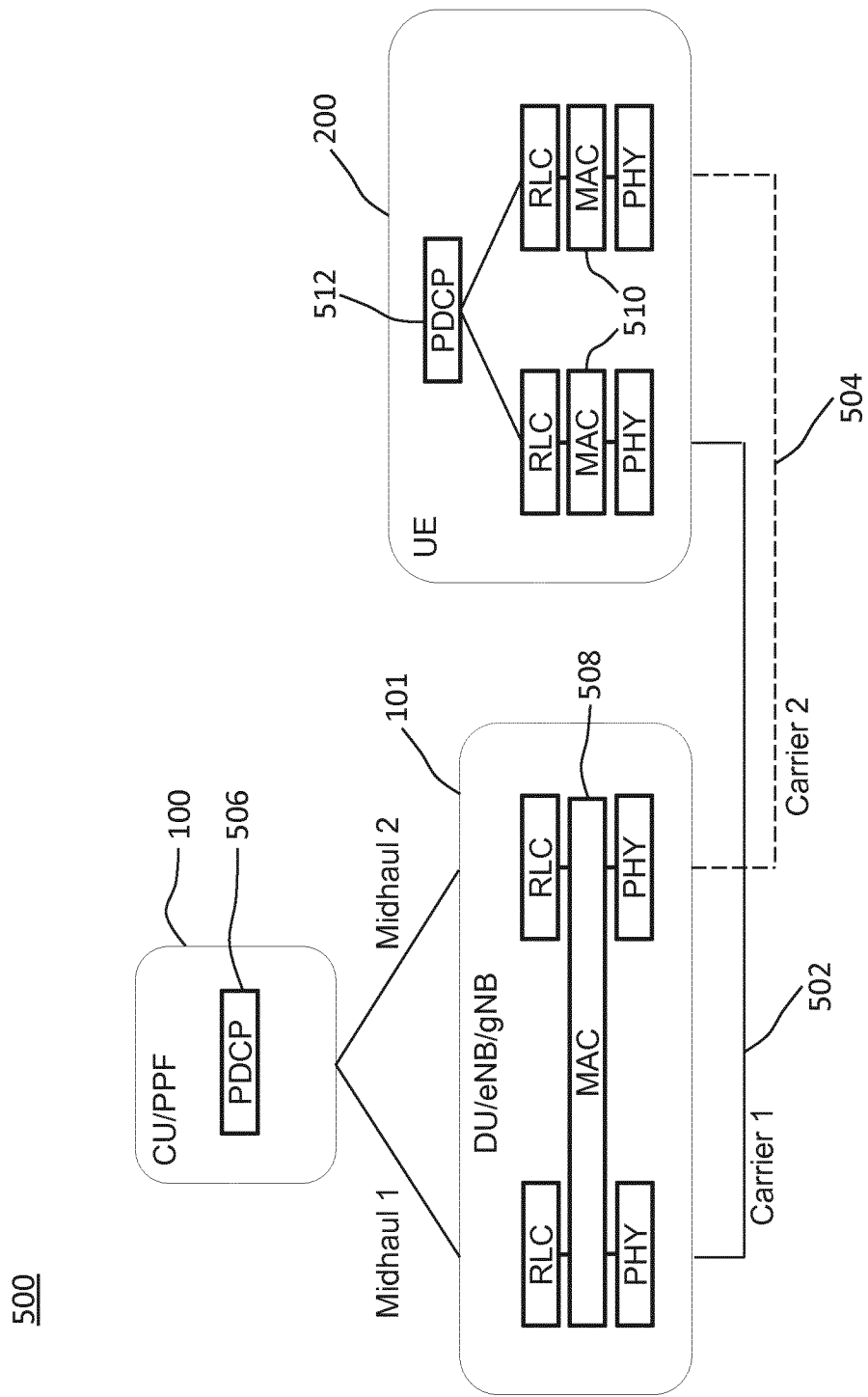
FIG. 6 schematically illustrates exemplary protocol stacks for second embodiments of the devices of FIGS. 1 and 2.

FIG. 6 schematically illustrates protocol stacks for exemplary second embodiments of the devices 100 and 200 using a CA architecture for the packet duplication. While the second embodiments are describes using the CA architecture of 3GPP NR, the second embodiments are also applicable for 3GPP LTE, in which the packet duplication may be used.

The at least one transmitting station is embodied by a RBS 101 using at least two carriers 502 and 504 for the CA. The PDCP layer 506 is an example of the terminating layer at the at least one transmitting station. The device 100 may be embodied by the PDCP layer (indicated at reference sign 100 in the exemplary second embodiment of FIG. 6), by the RBS 101, or a combination thereof.

In any embodiment, the packet duplication at the terminating layer (e.g., the PDCP layer) may comprises the step 304 of transmitting the same PDCP PDUs at least twice, e.g., once to an original RLC entity and a second time to the at least one additional RLC entity. With two independent transmission paths, packet duplication can increase reliability and/or reduce latency, which may be especially beneficial for ultra-reliable low latency (URLLC) services. For example, by virtue of the increased reliability, RLC-based retransmissions that incur excessive delay may be avoided or substantially reduced.

When packet duplication is announced according to the steps 302 and 402, the original PDCP PDU comprised in a first duplicate and the corresponding second duplicate shall not be transmitted on the same carrier.

In any embodiment, at least two different logical channels are used for the at least two duplicates, respectively. The at least two different logical channels may belong to the same MAC entity 508 (e.g., in the case of CA) or to different MAC entities 508 (e.g., in the case of DC). In the case of CA, logical channel mapping restrictions may be used in the MAC layer to ensure that the logical channel carrying the original PDCP PDUs and the logical channel carrying the corresponding one or more duplicates are not transmitted on the same carrier.

In any embodiment, the packet duplication may be selectively activated and de-activated (e.g., in the steps 302 and 308, respectively), e.g., per data radio bearer (DRB), by means of a MAC control element (CE). The configuration of the packet duplication may be hard-coded at the UE 200 or configured by the device 100 at the UE 200 (e.g., at least once) before the activation by transmitting a configuration message (e.g., RRC signaling).

Applications benefiting from the packet duplication include vehicular communication (e.g., V2X) and factory automation (e.g., MTC) in which case a high reliability for the radio transmission of data units (e.g., $10^{-5}$ data unit error rate, more commonly known as block error rate, BLER) within a target time period (e.g., to road infrastructure, other vehicles or robots) is necessary to ensure precision operation and/or quality of production.

The UE 200 (e.g., embodied by a robot) may be configured for an operation with a highly reliable radio communication by means of packet duplication, wherein the UE 200 commonly receives duplicate data units (briefly: duplicates) in the step 404. The UE 200 discards those duplicates it determines to be redundant. Furthermore, according to the monitoring step 404, the UE 200 (e.g., such a robot) determines the occasional lack of duplicate data units to be an anomaly and may interpret these occasions as indicating one of the duplicates has been lost over the transmission path.

Each such occasion or an excessive rate at which duplicate data units fail to arrive may be an indication that the targeted reliability requirement is not being satisfied, which may trigger the transmission of the control feedback according to the step 406, e.g., for triggering a corrective action 308 at the device 100.

The method 400 may be implemented at a receiving station 200 (e.g., a UE) being configured to expect duplicate transmissions (i.e., packet duplication) according to the step 402. The receiving station 200 determines whether duplicates are received and in case it detects excessive occurrences of duplicate data units failing to arrive according to the step 404, the receiving station 200 informs the at least one transmitting station (e.g., a RBS) according to the step 406.

In one embodiment the receiving station 200 (e.g., a UE) is configured and/or activated to be able to receive duplicate transmissions, i.e., a packet transmission of duplicate data units (briefly: duplicates). For example, the packet duplication is achieved by configuring the receiving station 200 with the radio protocol architectures of FIG. 5 and/or FIG. 6.

In the step 402, the receiving station 200 receives any indication (as the control message) that duplicates are being transmitted, i.e. the receiver 200 should be prepared to and expects to receive the duplicates.

Such an indication may be not inherently the implemented for existing protocol architectures (particularly, existing CA and/or existing DC), because packets could also be sent only via one link or only sometimes via both. Therefore, it is important that the receiving station 200 (e.g. the UE) is explicitly configured and/or activated to expect and receive duplicates according to the step 402. In an in LTE or NR implementation of the steps 302 and 402, the duplication-expectation-activation may be indicated from the radio network (e.g., an eNB or gNB) to the UE, e.g. by means of MAC control signaling (MAC CE) or RRC message.

Figure 7:
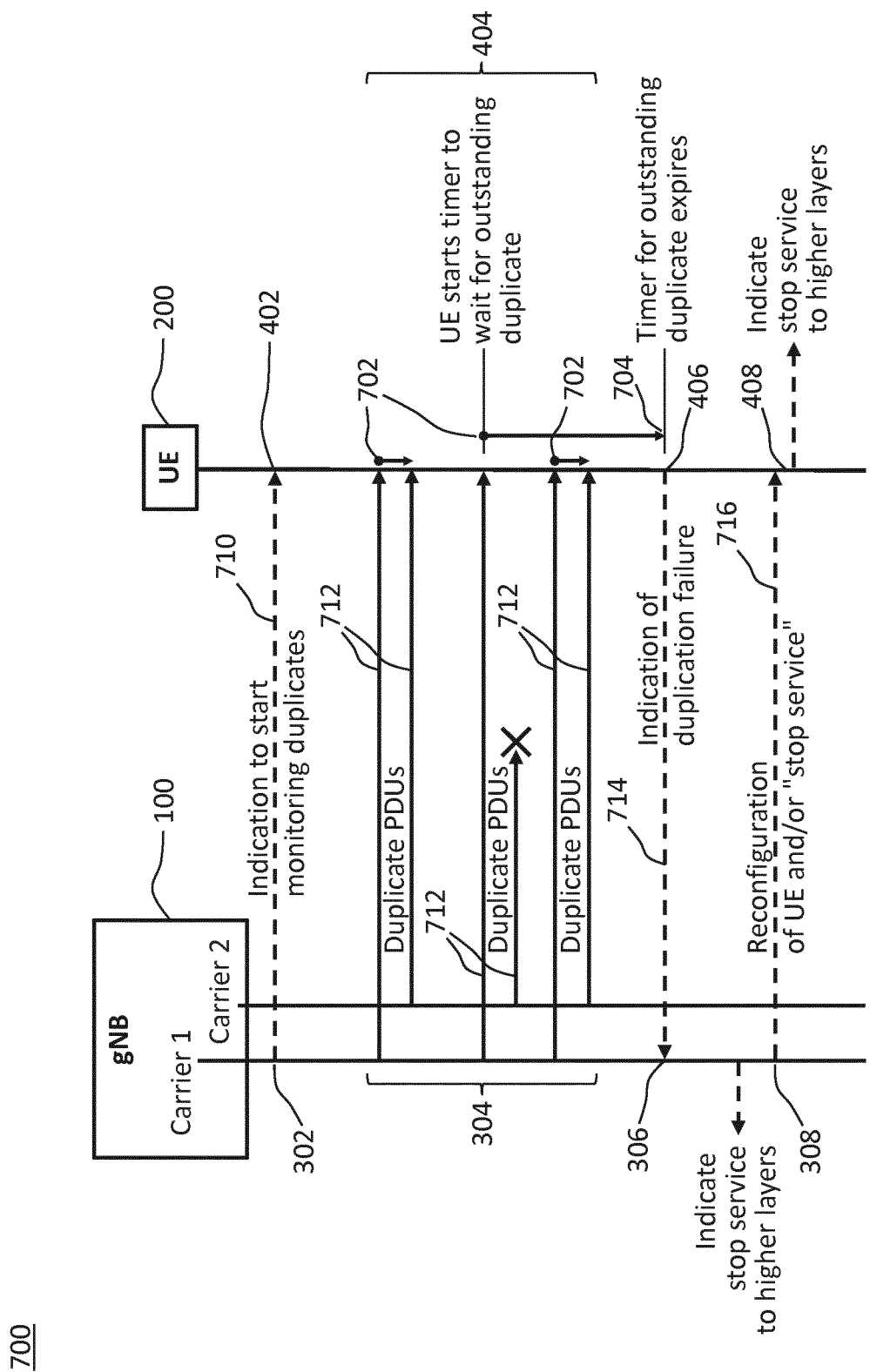
FIG. 7 shows an exemplary signaling diagram resulting from embodiments of the devices of FIGS. 1 and 2 performing implementations of the methods of FIGS. 3 and 4.

FIG. 7 shows a schematic signaling diagram 700 resulting from embodiments (e.g., the second embodiments) of the devices 100 and 200 in radio communication. The device 100 is embodied by a gNB as the transmitting station. The device 200 is embodied by a UE as the receiving station.

After receiving the control message 710 according to the step 402, the receiving station 200 monitors in the step 404 whether duplicates 712 are actually incoming and/or successfully received. The monitoring 404 may comprise (e.g., in an LTE or NR implementation of the method 400) at least one of the following monitoring substeps.

In a first monitoring substep, e.g., in the PDCP entity 512 of the receiving station 200, a timer is started at reference sign 702 for each new incoming packet (e.g., identified by a sequence number). The timer is stopped once the (e.g., second or last) duplicate 712 (i.e., a data unit with the same sequence number) is received. When the timer expires at reference sign 704, a duplication-failure is triggered. The timer can be configured according to a maximum tolerable non-duplication time, i.e. a time in which reliability due to duplicate transmissions 304 does not need to be satisfied.

In a second monitoring substep, e.g., in the PDCP entity 512 of the receiving station 200, a counter for a certain or each sequence number (SN, e.g. the SN with value X) is initiated to be zero upon the first reception of a duplicate 712 with the corresponding SN X. The counter is increased for each reception of a packet (e.g., each duplicate 712 of another packet) with a SN that is higher than X, while the second or last duplicate 712 of the packet with SN X has not been received (i.e., the complete reception of the duplicates is still outstanding). Once the counter reaches a threshold value, the failure of the reception of duplicates 712 is triggered. The counter may be configured according to a maximum skew (as the threshold value) that is tolerable for the radio communication. The skew may define a limit for out of sequence reception of the duplicated packets.

In a third second monitoring substep, the receiving station 200 considers the occasional lack of duplicate packet reception (i.e., the reception of an incomplete number of duplicates, e.g., a single duplicate for a certain packet) to be an anomaly and interprets these occasions as indicating one of the duplicates 712 been lost over the transmission path. An excessive rate at which the reception of the duplicates fail to arrive is an indication that the targeted reliability requirement is not being satisfied and the triggering of a corrective action is required. This excessive rate may be configured in the receiving station 200. For example, the configuration may allow for up to a maximum of Y duplicate packets failing to arrive per unit time.

In any embodiment of the device 200 may be implemented to indicated the failure of the reception of the duplicates 712 in the step 406, e.g., responsive to a single failure (which may be based on the time and/or on the counter) or upon exceeding a threshold for a failure rate. The rate may correspond to the number of failure occasions per time, wherein each of the failure occasions may correspond to a packet-specific failure (which may be based on the timer and/or on the counter).

In combination with any implementation of determining the failure of the reception of the duplicates 712, responsive to the determined failure (e.g., at reference sign 704 in FIG. 7), the control feedback 714 indicative of the failure is transmitted in the step 406. Thus, the receiving station 200 informs the device 100 (being the at least one transmitting station or via the at least one transmitting station) about the determined failure.

The control feedback 714 may be indicative of at least one of for which packet (e.g., the corresponding sequence number) the duplication failure occurred, for which radio bearer or logical channel it occurred and at which time. The transmitting step 406 for indicating the failure may comprise at least one of the following indicating substeps (e.g., in an LTE and/or NR implementation).

In a first indicating substep, the receiving station 200 (e.g., a UE) transmits the control feedback 714 to the at least one transmitting station (e.g., a serving eNB and/or gNB) by means of RRC signaling indicative of the duplication failure. That is, the receiving station 200 transmits an RRC indication to the RAN.

In a second indicating substep, the control feedback 714 is provided to the at least one transmitting station by means of in-band signaling, e.g. using a PDCP control PDU. Alternatively or in addition, a MAC CE may be used.

In a third indicating step, based on the received control feedback 714 indicative of the failure, the device 100 (e.g., a network node, particularly the at least one transmitting station) may reconfigure the receiving station 200 (e.g., the UE) and/or adjust its scheduling behavior according to the configuration message 716 in the steps 308 and 408.

Optionally in the step 308 and/or the step 408, an indication is provided to higher layers (e.g., an application layer) informing an application or service performed or controlled by the transmitting station 100 (e.g., an application of the host computer) and/or the receiving station 200 (e.g., the UE in communication with the host computer), respectively. The indication may inform about a non-fulfillment of reliability targets. The connection (or at least one of the two or more logical channels) with the UE may be stopped or closed in the steps 308 and 408 by means of the configuration message 716.

Alternatively or in addition, a signal 716 indicating to stop the service may be transmitted in the step 308 and received in the step 408. The application service may be stopped as well, i.e. for the example of the factory automation scenario, the production process or industrial robot may stop operation, e.g. in order to fulfill security requirements.

Alternatively or in addition, a reconfiguration is transmitted to the receiving station 200 in the step 308. The configuration message 716 may comprise a configuration to fulfill the reliability requirements by other means, e.g. duplication via another carrier, using a more robust modulation and/or coding scheme and/or by replication (e.g., duplication overtime).

In variants of the steps 306 and 406, which may be implemented with any embodiment, the control feedback 714 (e.g., the duplication failure indication) is polled. That is, the step 406 is performed whenever the receiving station 200 receives a poll signal. For example, the poll signal triggers the receiving station 200 to perform the monitoring 404 (e.g. by starting or evaluating the timer and/or the counter). In the absence of the poll signal, the timer and/or the counter may be not evaluated or not even updated. For example the poll signal may be implemented identical to the control message 710 initiating the monitoring 404.

In one variant, the poll signal may be included in a PDCP PDU header. In another variant combinable with the one variant, the monitoring 404 is initiated or controlled packet by packet. For example, for each PDCP PDU for which the poll signal is not included (e.g., for every PDU except those comprising an indication to be not monitored) the timer and/or the counter may be initialized and updated. Any step of the methods 300 and 400 may be implemented in a packet-specific manner. For example, the PDCP PDUs may be marked as to whether or not the receiving station 200 is required to monitor the reception of duplicates 712 for the marked packet.

Figure 8:
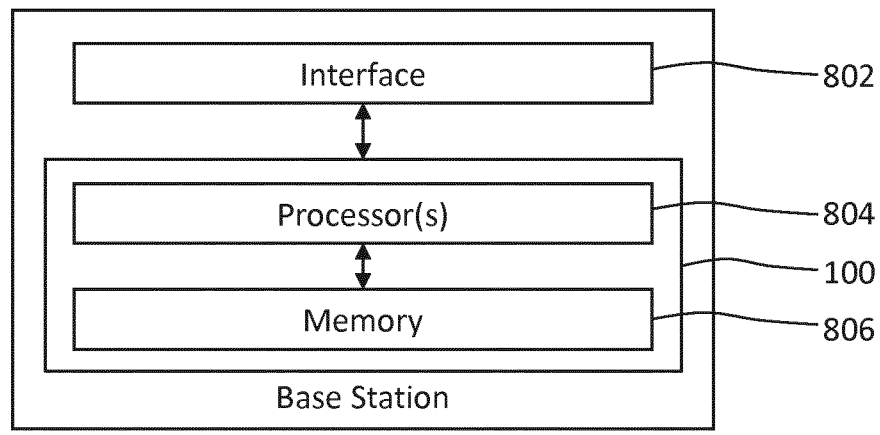
FIG. 8 shows a schematic block diagram of an embodiment of the device of FIG. 1.

FIG. 8 shows a schematic block diagram for an embodiment of the device 100. The device 100 comprises one or more processors 804 for performing the method 300 and memory 806 coupled to the processors 804. For example, the memory 806 may be encoded with instructions that implement at least one of the modules 102, 104 and 106.

The one or more processors 804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 806, transmitter functionality. For example, the one or more processors 804 may execute instructions stored in the memory 806. Such functionality may include providing various features and steps discussed herein, including any of the benefits disclosed herein. The expression "the device being operative to perform an action" may denote the device 100 being configured to perform the action.

As schematically illustrated in FIG. 8, the device 100 may be embodied by a base station 800, e.g., functioning as a transmitting station. The device 800 comprises a radio interface 802 coupled to the device 100 for radio communication with one or more radio devices.

Figure 9:
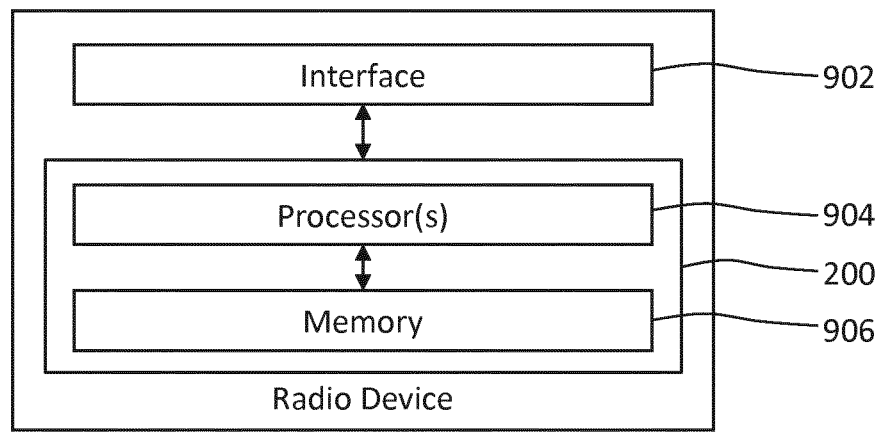
FIG. 9 shows a schematic block diagram of an embodiment of the device of FIG. 2.

FIG. 9 shows a schematic block diagram for an embodiment of the device 200. The device 200 comprises one or more processors 904 for performing the method 400 and memory 906 coupled to the processors 904. For example, the memory 906 may be encoded with instructions that implement at least one of the modules 202, 204 and 206.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 906, receiver functionality. For example, the one or more processors 904 may execute instructions stored in the memory 906. Such functionality may include providing various features and steps discussed herein, including any of the benefits disclosed herein. The expression "the device being operative to perform an action" may denote the device 200 being configured to perform the action.

As schematically illustrated in FIG. 9, the device 200 may be embodied by a radio device 900, e.g., functioning as a receiving station. The radio device 900 comprises a radio interface 902 coupled to the device 200 for radio communication with one or more base stations.

Figure 10:
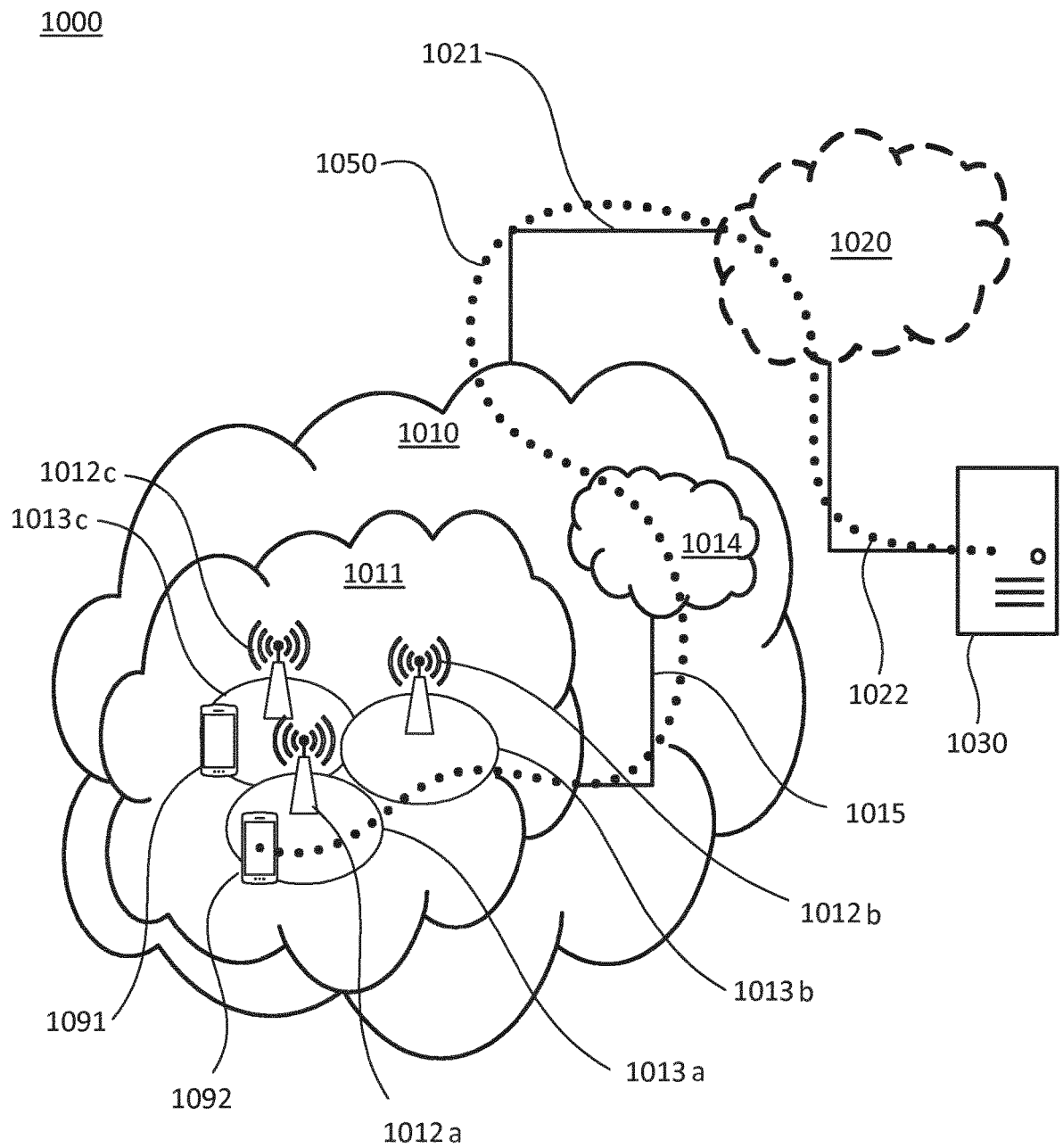
FIG. 10 schematically illustrates an exemplary telecommunication network connected via an intermediate network to a host computer.

With reference to FIG. 10, in accordance with an embodiment, a communication system 1000 includes a telecommunication network 1010, such as a 3GPP-type cellular network, which comprises an access network 1011, such as a radio access network, and a core network 1014. The access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to the core network 1014 over a wired or wireless connection 1015. A first user equipment (UE) 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system 1000 of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data, which is transmitted using the OTT connection 1150. The user data may depend on the reliability of the OTT connection monitored in the step 404 and/or reported in the step 406. The user data may comprise auxiliary information or precision advertisements (also: ads) delivered to the UE 1130, e.g., a moving vehicle. The reliability may be reported by the UE 1130 to the host computer, e.g., using the OTT connection 1150, and/or by the base station 1120, e.g., using a connection 1160.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
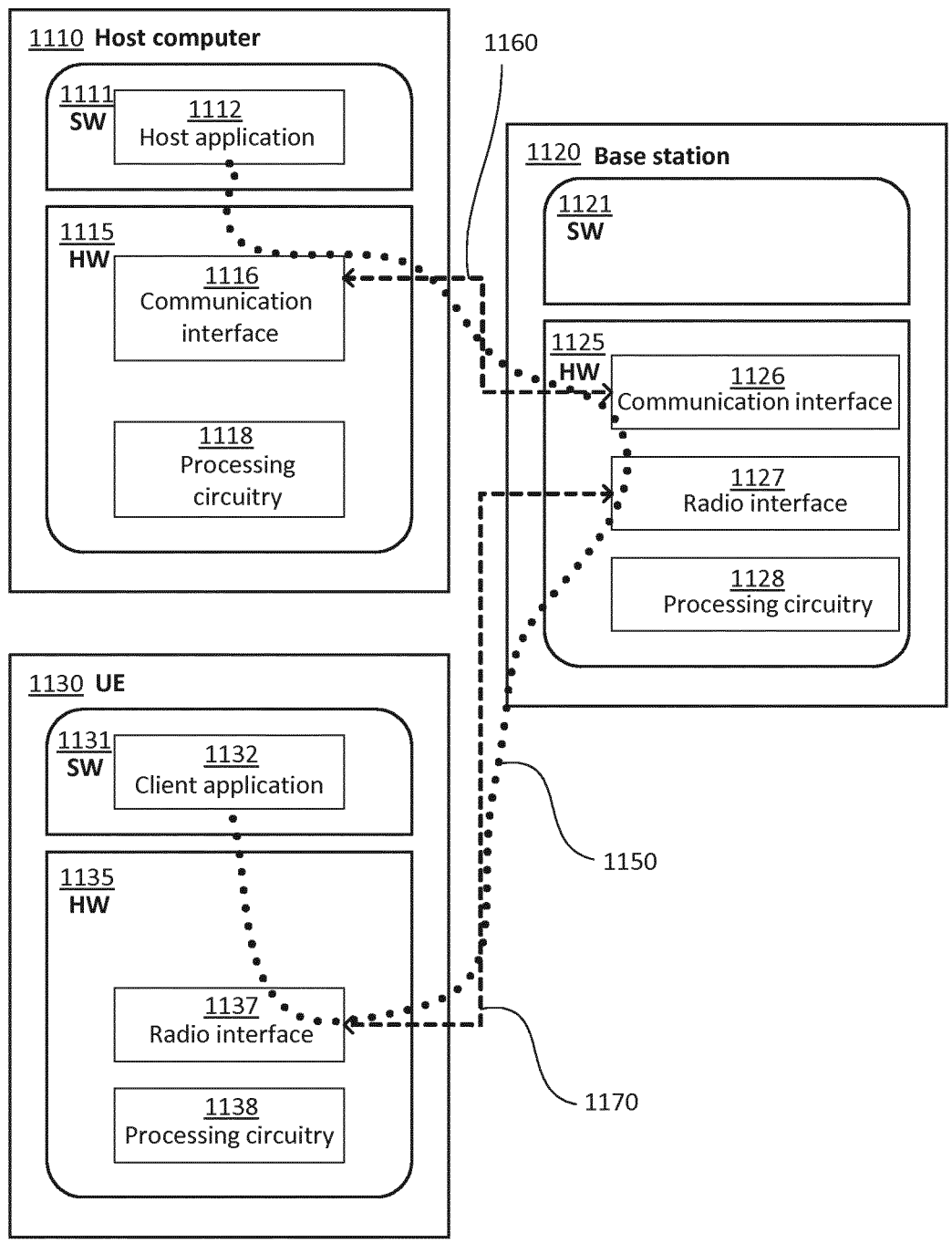
FIG. 11 shows a generalized block diagram of a host computer communicating via an embodiment of a base station with a user equipment over a partially wireless connection.

It is noted that the host computer 1110, base station 1120 and UE 1130 illustrated in FIG. 11 may be identical to the host computer 1130, one of the base stations 1112a, 1112b, 1112c and one of the UEs 1191, 1192 of FIG. 10, respectively. This is to say, the inner workings of these entities may be as shown in FIG. 11 and independently, the surrounding network topology may be that of FIG. 10.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or "dummy" messages, using the OTT connection 1150 while it monitors propagation times, errors etc.

Figures 12, 13:
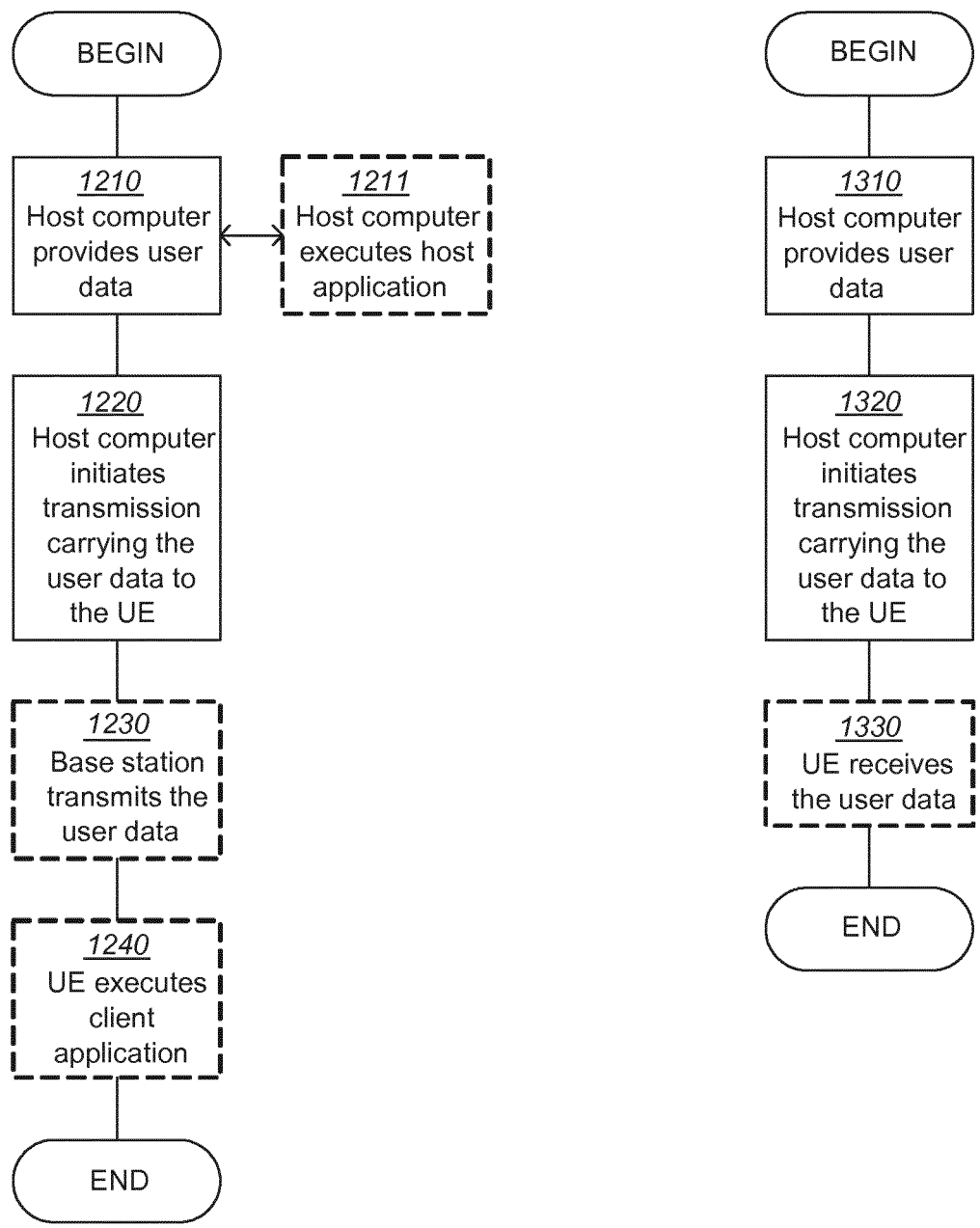
FIGS. 12 and 13 show flowcharts for methods implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

In any embodiment, at least one base station or another node of a radio network may indicate to the UE that duplicated packets are to be expected. The UE may monitor (i.e., check) that duplicate packets are received and may indicate to the base station or other node that the duplicate check failed. This indication may trigger a reconfiguring of the connection and/or system.

The technique may be implemented for monitoring, detecting and/or controlling a reliability degradation, e.g., in NR RAN, and LTE RAN or a combination thereof such as NSA NR. At least some embodiments of the technique can monitor, detect and/or control an ongoing fulfillment of a reliability requirement provided through packet duplication, e.g., by a UE. Same or further embodiments enable timely controlling, detecting and/or mitigating an under-fulfillment of the reliability requirement.

As has become apparent from above description, embodiments can monitoring and/or verifying the fulfillment of reliability requirements when using packet duplication, e.g., in LTE or NR. In this way, LTE and NR radio access technologies become feasible to be used in systems for which reliability monitoring or verification is required, such as factory automation systems.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of controlling packet duplication of a packet in a radio transmission from at least one transmitting station to a receiving station, the method comprising:
transmitting, to the receiving station, a control message that is indicative of the packet duplication in the radio transmission, the control message controlling the receiving station to monitor a reception of duplicates of the packet, wherein each of the duplicates of the packet comprises a protocol data unit (PDU) of a split Packet Data Convergence Protocol (PDCP) layer of a communication protocol for the radio transmission that terminates a PDCP protocol;
transmitting, to the receiving station, two or more, PDCP PDUs of the duplicate PDCP PDUs to respective PDCP entities in the split PDCP layer, each associated with a different one of the duplicate PDCP PDUs for processing the associated duplicate PDCP PDU;
receiving, from the receiving station, acknowledgement feedback that is indicative of at least one of a success and a failure of the reception of the duplicate PDCP PDUs; and
transmitting, to the receiving station and responsive to the acknowledgement feedback, a configuration message indicative of a reconfiguration of the radio transmission responsive to the acknowledgement feedback.

2. The method of claim 1, wherein the acknowledgement feedback is received for the first or each of the packet that is subject to a failure of the reception of the duplicate PDCP PDUs.

3. The method of claim 1, wherein the control message is indicative of a number of the duplicate PDCP PDUs.

4. The method of claim 1, wherein the PDCP layer generates the duplicate PDCP PDUs for each of the packet.

5. The method of claim 1, further comprising reconfiguring the receiving station based on the acknowledgement feedback.

6. The method of claim 1, wherein the configuration message is indicative of a stop of the packet duplication and/or a stop of the monitoring responsive to a failure of the reception of the duplicate PDCP PDUs.

7. A method of monitoring packet duplication of a packet in a radio reception from at least one transmitting station at a receiving station, the method comprising:
receiving, from the at least one transmitting station, a control message that is indicative of the packet duplication in the radio transmission, the control message controlling the receiving station to monitor a reception of duplicates of the packet, wherein each of the duplicates of the packet comprises a protocol data unit (PDU) of a split Packet Data Convergence Protocol (PDCP) layer of a communication protocol for the radio transmission that terminates a PDCP protocol;
monitoring a reception of duplicate PDCP PDUs from the at least one transmitting station, by respective entities in the split PDCP layer, each associated with a different one of the duplicate PDCP PDUs, and each of the entities processing the associated duplicate for each of the packet;
transmitting, to one or more of the at least one transmitting station, acknowledgement feedback that is indicative of of a success and a failure of the reception of the duplicate PDCP PDUs;
receiving, from the at least one transmitting station and responsive to the acknowledgement feedback, a configuration message indicative of a reconfiguration of the radio transmission responsive to the acknowledgement feedback; and
reconfiguring the receiving station according to the configuration message.

8. The method of claim 7, wherein the monitoring comprises determining the success of the reception of the duplicate PDCP PDUs based on receiving a predefined number of the duplicate PDCP PDUs.

9. The method of claim 7, wherein the packet duplication of the packet comprises a plurality of packets each indicative of a sequence number (SN), and wherein each of the duplicate PDCP PDUs is indicative of the SN of the corresponding one of the plurality of packets.

10. The method of claim 9, wherein the monitoring comprises determining the failure of the reception of the duplicate PDCP PDUs based on receiving a duplicate indicative of a second SN after receiving only one duplicate or a predefined number of duplicate PDCP PDUs indicative of a first SN, wherein the second SN is greater than or subsequent to the first SN.

11. The method of claim 7, wherein the configuration message is indicative of a stop of the packet duplication and/or a stop of the monitoring responsive to a failure of the reception of the duplicate PDCP PDUs.

12. A device for controlling packet duplication of packet in a radio transmission from at least one transmitting station to a receiving station, the device comprising:
processing circuitry;
memory containing instructions executable by the processing circuitry whereby the device is operative to:
transmit, to the receiving station, a control message that is indicative of the packet duplication in the radio transmission, the control message controlling the receiving station to monitor a reception of duplicates of the packet, wherein each of the duplicates of the packet comprises a protocol data unit (PDU) of a split Packet Data Convergence Protocol (PDCP) layer of a communication protocol for the radio transmission that terminates a PDCP protocol;
transmit, to the receiving station, two or more of the duplicate PDCP PDUs to respective PDCP entities in the split PDCP layer, each associated with a different one of the duplicate PDCP PDUs for processing the associated duplicate PDCP PDU;
receive, from the receiving station, acknowledgement feedback that is indicative at least one of a success and a failure of the reception of the duplicate PDCP PDUs; and
transmit, to the receiving station and responsive to the acknowledgement feedback, a configuration message indicative of a reconfiguration of the radio transmission responsive to the acknowledgement feedback.

13. A device for monitoring packet duplication of packet in a radio reception from at least one transmitting station at a receiving station, the device comprising:
processing circuitry;
memory containing instructions executable by the processing circuitry whereby the device is operative to:
receive, from the at least one transmitting station, a control message that is indicative of the packet duplication in the radio transmission, the control message controlling the receiving station to monitor a reception of duplicates of the packet, wherein each of the duplicates of the packet comprises a protocol data unit (PDU) of a split Packet Data Convergence Protocol (PDCP) layer of a communication protocol for the radio transmission that terminates a PDCP protocol;
monitor a reception of the duplicate PDCP PDUs from the at least one transmitting station, by respective entities in the split PDCP layer, each associated with a different one of the duplicate PDCP PDUs, and each of the entities processing the associated duplicate for each of the packet;
transmit, to one or more of the at least one transmitting station, acknowledgement feedback that is indicative of of a success and a failure of the reception of the duplicate PDCP PDUs;
receive, from the at least one transmitting station and responsive to the acknowledgement feedback, a configuration message indicative of a reconfiguration of the radio transmission responsive to the acknowledgement feedback; and
reconfigure the receiving station according to the configuration message.

* * * * *